UNITED STATES PATENT OFFICE.

ABRAHAM KRONSTEIN, OF KARLSRUHE, GERMANY.

PROCESS FOR RENDERING MATERIAL OF ANY KIND PROOF AGAINST THE ACTION OF MOISTURE AND OF CHEMICAL AGENTS.

No. 919,031.      Specification of Letters Patent.      Patented April 20, 1909.

Application filed March 2, 1901. Serial No. 49,600.

*To all whom it may concern:*

Be it known that I, ABRAHAM KRONSTEIN, chemist and doctor of philosophy, a subject of the Emperor of Austria-Hungary, at present residing at 95 Kriegs-strasse, Karlsruhe, German Empire, have invented a certain new and useful Process for Rendering Material of Any Kind Proof Against the Action of Moisture and of Chemical Agents, of which the following is a specification.

This invention refers to a process for imparting to materials of any kind, such a high degree of resistancy that they will even withstand the action of acids and dilute alkalies at an elevated temperature.

My process is based upon the property of certain organic bodies to form solid substances by prolonged heating at an elevated temperature, which are insoluble in the ordinary solvents, and are not attacked by the action of acids or of dilute alkalies even at the elevated temperature of about 270 degrees centigrade. Such solid and insoluble substances can be obtained by prolonged treating at a temperature above 100 degrees centigrade of the so-called wood-oil or tung-oil the oil expressed from the tree known as *Aleurites cordata* or *Elaeococca vernicia* and to which I shall refer as wood oil in this application, the duration of the treatment necessary to obtain insolubility being determined by the degree of temperature employed. As a result of researches about the nature of the said oil which was found to be an unsaturated organic compound of ether-like constitution it has been found that such substances of almost absolute resistibility against chemical agents and against the action of high heat and which do not possess the glutinous sticky appearance of ordinary curdled or coagulated wood oil, are also obtained from other organic unsaturated ethereal compounds and hydrocarbons which behave like tung-oil or wood oil, such as from allyl cinnamic-ester, from styracine and from certain hydrocarbons, such as styrole, cyclopentadien or mixtures of these bodies and also though of inferior quality as compared with the pure products, from mixtures with wood oil as well as from mixtures of an excess of wood-oil with any other vegetable oils or resins by submitting them to the above described heating process and without the addition of solvents and without the addition of artificial driers or other chemicals.

In order to intimately combine the solidified and insoluble products referred to with the material or the goods to which resistibility is to be imparted without altering the shape or structure of the same, the conversion into the insoluble solid modification by heat only and without the addition of any chemical agent is effected after having previously applied the substances to the goods or to the material in a liquid condition. Thus for instance, objects made of fibrous material if covered or impregnated with such organic bodies will become firmly united with the solid bodies resulting from prolonged heating of the same. Inasmuch as those solid bodies obtained from the above mentioned organic bodies by prolonged heating, will always retain a certain degree of elasticity, it is obvious that the material united therewith will always show a certain elasticity and resiliency, no matter whether the material has been impregnated or covered with the organic bodies capable of solidification. I am thus enabled to manufacture for instance, vessels combining a high degree of resistibility with a certain amount of elasticity, which are particularly suitable for use in chemical manufacture, for electric accumulators and for similar purposes, inasmuch as they resist the action of hydrofluoric acid and of other acids, and of dilute alkalies even at an elevated temperature up to about 270 degrees centigrade. Since the solidification process which is based upon polymerization of the organic bodies above mentioned, yields a much superior and uniform product, if the heating has been effected under exclusion of air, it is obvious that the vessels and materials in general thus manufactured will become the more resistant, the more the access of air during the process of manufacture has been excluded.

Those parts of the organic bodies referred to and capable of solidification which are contained in the pores or interstices of the fibrous or porous material employed, are protected from the access of air by that part of the said organic bodies which covers the surface of the material or vessel, and they will therefore insure the resistibility of the material or vessel to be treated.

Objects which have been submitted to the course of manufacture above outlined, may be submitted to any desired mechanical treatment, they may for instance be worked with grinding and cutting tools and they are capable of assuming any desired shape. In this manner it is possible to manufacture vessels for the uses of chemical factories from cellulose or from wood pulp, which will resist the action of acids, such as hydrofluoric acid and of 40% (forty per cent.) sulfuric acid, of diluted alkalies and of solvents, such as alcohol, benzol, oil of turpentine, at an elevated temperature even. I may also effect the solidification only upon the surface of the material to be treated, thereby producing a firmly adhering coating upon the surface of metal and clay vessels for instance, and upon vessels made from gypsum, cement and similar porous material, such vessels being thereby protected against the effects of acids. The access of air during the heating process as carried out in this instance will suffice to impart a high gloss to the said coating without the necessity of subsequent polishing.

It is evident that the above mentioned organic bodies may also be used as a resistancy imparting material, even in the state of partial polymerization by preliminary heating, the reaction being completed by the subsequent heating of the objects or material thus impregnated or coated.

The process may also be used advantageously for impregnating ropes, network and similar material. The duration of the heating process varies according to the nature of the organic substances used for impregnation and according to the degree of elasticity it is desired to produce. For material where a high degree of elasticity is essential, mixtures of wood oil with other oils or with resins are preferably used instead of wood oil alone as ordinarily used.

The process may also be combined with the ordinary varnishing or japanning processes, in which heretofore a great deal of the valuable japan was wasted by being absorbed owing to the porosity of the material. All these japanning processes are rendered much simpler and cheaper, by first filling the pores of the material under treatment with the solidified oils or similar substances according to the present invention, and then applying the coating of japan in the ordinary manner.

It is also obvious that the organic substances above outlined and on the solidification of which the resistibility of the vessels manufactured according to my invention depends may be combined with coloring or disinfecting agents or with odorous principles of any kind, whereby the material impregnated or treated with these mixtures will become colored or assume any desired hygienic or industrial property. The fact that the impregnation has been effected by a polymerization process, insures the retaining and the efficiency of the other substances which have been added to these polymerized products. The process may for instance be carried out by proceeding in the following manner:—The material to be submitted to the treatment as above described, vessels for instance, is first saturated with the above mentioned organic bodies in a liquid state which become insoluble and solidify on prolonged heating, the so-called Chinese wood oil or tung oil in particular or its mixtures with solvents or of an excess of wood oil with other oils or resins being used for this purpose. After the oil has penetrated into the material or impregnated the same, the excess of oil is removed and the material is then heated up to 200 degrees centigrade in a suitable oven. With pure wood oil, solidification and insolubility is reached after about 8 to 10 hours' heating already.

Inasmuch as the conversion into the solid and insoluble modification sets in at any temperature above 100 degrees centigrade, the duration of the treatment necessary to obtain solidification depending on the degree of temperature employed, it will be evident that in case of the formation of the solid insoluble modification having been effected at a comparatively low temperature, but always exceeding 100 degrees centigrade, the objects treated and impregnated with such solidified bodies are able to stand temperatures considerably higher than those at which the solidification took place, that is to say such objects may be exposed without damage to temperatures up to 270 degrees centigrade even if the solidification that is to say the formation of the insoluble modification has been effected at a temperature only comparatively little above 100 degrees centigrade. This it has not been possible to effect by the use of any other so-called varnish forming oils and compounds heretofore used. Nor was it possible to obtain a coating or to devise means for filling the pores of the object under treatment with an organic substance which would withstand the action of such high temperatures and of strong chemicals such as acids and alkalies at such elevated temperatures.

If the treatment and the heating process in particular are effected at the exclusion of air, the material thus treated shows almost the original color, while if the air is admitted, the color of the product is changed to a dark red. In this manner finished articles of any kind such as sheets or plates of wood pulp, card board, paper, asbestos, asbestos paper or the like and fibrous goods, such as ropes, nets, tissue of any kind, and material of cork, clay and the like may be treated and rendered damp proof and resistant as above described.

Owing to their property of being nonconductors of heat and electricity and of being proof against moisture, the objects thus prepared are of great importance for the electrical industries, as well as in chemical factories, in the manufacture of linoleum and for washers and packing purposes, and as a protecting covering for heating tubes.

What I claim and desire to secure by Letters Patent of the United States, is:—

1. The process herein described of filling the pores of porous material to any predetermined depth required, which consists in impregnating said material with liquid wood oil (tung oil) and subjecting the material thus containing the oil to a temperature sufficient to convert the oil into its solid polymeric form.

2. The process herein described, of filling the pores of porous material with a solid heat-resisting filling extending to any depth desired in the material, which consists in impregnating the material from the outside surface thereof with a solidifiable mixture of wood oil and drying oils, and then applying sufficient heat to convert the mixture of oils into a solid polymeric form.

3. The process herein described of filling the pores of porous material of any kind with a solid, firmly adhering waterproof and heat resisting filling, down to any depth of the material desired, which consists in impregnating the said material with a solidifiable mixture of wood oil with resins, and then converting into solid polymeric form, by the action of heat, the substance retained by the material.

4. As new articles of manufacture, porous objects containing solidified heat resisting insoluble wood oil within and upon the pores.

5. As new articles of manufacture, porous objects impregnated with solidified heat resisting insoluble mixtures of wood oil with vegetable oils.

6. The process herein described, of filling the pores of porous material, which consists in causing liquid wood oil (tung oil) to enter said pores, and then converting the liquid wood oil thus contained, into its solid polymeric form.

7. A coating process which consists in applying to the body to be coated a film of raw tung oil and then subjecting the body thus coated to heat at a sufficient temperature and for a sufficient length of time to transform the oil into an insoluble isomeric form.

8. A process of coating, which consists in mixing a body of tung or Chinese wood oil with a hydrocarbon and applying the compound to the body to be coated, and then heating the same sufficiently to transform the oil into an insoluble isomeric form.

9. A process of coating metals, which consists in applying to the metal a coating of tung or Chinese wood oil, and heating the latter at a temperature sufficient to transform the oil into an insoluble isomeric form.

In witness whereof I have hereunto signed my name in the presence of two subscribing witnesses.

ABRAHAM KRONSTEIN.

Witnesses:
JACOB ADRIAN,
H. W. HARRIS.